US009756355B2

(12) United States Patent
Wang et al.

(10) Patent No.: US 9,756,355 B2
(45) Date of Patent: Sep. 5, 2017

(54) VALUE RANGES FOR SYNTAX ELEMENTS IN VIDEO CODING

(71) Applicant: QUALCOMM Incorporated, San Diego, CA (US)

(72) Inventors: Ye-Kui Wang, San Diego, CA (US); Adarsh Krishnan Ramasubramonian, San Diego, CA (US); Fnu Hendry, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 14/743,632

(22) Filed: Jun. 18, 2015

(65) Prior Publication Data

US 2015/0373377 A1    Dec. 24, 2015

Related U.S. Application Data

(60) Provisional application No. 62/015,210, filed on Jun. 20, 2014.

(51) Int. Cl.
*H04N 19/52*        (2014.01)
*H04N 19/124*       (2014.01)
(Continued)

(52) U.S. Cl.
CPC ........... *H04N 19/52* (2014.11); *H04N 19/124* (2014.11); *H04N 19/152* (2014.11);
(Continued)

(58) Field of Classification Search
CPC ...... H04N 19/70; H04N 19/105; H04N 19/44; H04N 19/58; H04N 19/573; H04N 19/136; H04N 19/152
See application file for complete search history.

(56) References Cited

U.S. PATENT DOCUMENTS

| 2014/0092988 A1* | 4/2014 | Deshpande | ............ H04N 19/70 375/240.26 |
| 2014/0211849 A1* | 7/2014 | Deshpande | .......... H04N 19/105 375/240.12 |

(Continued)

OTHER PUBLICATIONS

Hannuksela (Nokia) M M: "MV-HEVC/SHVC HLS: On non-HEVC base layer", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16 ); No. JCTVC-P0140, Jan. 3, 2014, XP030115650, URL: http://wftp3.itu.int/av-arch/jctvc-site/.

(Continued)

*Primary Examiner* — Obafemi Sosanya
(74) *Attorney, Agent, or Firm* — Procopio, Cory, Hargreaves & Savitch LLP

(57) ABSTRACT

Systems and methods for coding video data are disclosed. The method can include determining a reference picture set (RPS) for a current picture based on one or more reference pictures. The method can also include determining a picture order count (POC) value of each reference picture of the RPS and identifying at least one of a number of long-term reference pictures and a number of short-term reference pictures within the RPS. The method can also include applying constraints to the number of long-term pictures and the number of short-term pictures in the RPS, the constraints being based on the POC value and a maximum decoded picture buffer size minus one, if a video sequence parameter (VPS) extension is in use. The method can include generating at least one syntax element identifying the RPS based on the constraints and encoding the current picture based on the at least one syntax element.

20 Claims, 6 Drawing Sheets

(51) Int. Cl.
- *H04N 19/70* (2014.01)
- *H04N 19/176* (2014.01)
- *H04N 19/187* (2014.01)
- *H04N 19/597* (2014.01)
- *H04N 19/172* (2014.01)
- *H04N 19/174* (2014.01)
- *H04N 19/182* (2014.01)
- *H04N 19/152* (2014.01)
- *H04N 19/573* (2014.01)
- *H04N 19/58* (2014.01)
- *H04N 19/30* (2014.01)
- *H04N 19/82* (2014.01)
- *H04N 19/105* (2014.01)

(52) U.S. Cl.
CPC ......... *H04N 19/172* (2014.11); *H04N 19/174* (2014.11); *H04N 19/176* (2014.11); *H04N 19/182* (2014.11); *H04N 19/187* (2014.11); *H04N 19/30* (2014.11); *H04N 19/573* (2014.11); *H04N 19/58* (2014.11); *H04N 19/597* (2014.11); *H04N 19/70* (2014.11)

(56) References Cited

U.S. PATENT DOCUMENTS

| | | |
|---|---|---|
| 2014/0301451 A1 | 10/2014 | Deshpande |
| 2014/0301477 A1* | 10/2014 | Deshpande ............ H04N 19/82 375/240.25 |
| 2015/0373361 A1 | 12/2015 | Wang |

OTHER PUBLICATIONS

International Search Report and Written Opinion—PCT/US2015/036600—ISA/EPO—Sep. 24, 2015.

Itech G., et al., "MV-HEVC Draft Text 8", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct3v/ ,, No. JCT3V-H1002-v5, Jun. 3, 2014, XP030132292, 163 pages.

Wang Y-K., et al., "MV-HEVC/SHVC HLS: Miscellaneous Cleanups", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0227, Jun. 21, 2014 (Jun. 21, 2014), pp. 1-6, XP030116527, section 1.3.

* cited by examiner

VALUE RANGES FOR SYNTAX ELEMENTS IN VIDEO CODING

INCORPORATION BY REFERENCE TO ANY PRIORITY APPLICATIONS

This application claims the benefit of U.S. Provisional Application No. 62/015,210, filed Jun. 20, 2014, entitled "PROFILE, TIER, LEVEL FOR THE 0-TH OUTPUT LAYER SET AND VALUE RANGES OF SYNTAX ELEMENTS IN VIDEO CODING," which is incorporated by reference in its entirety.

BACKGROUND

Technological Field

This application relates to the field of video coding and compression, for example, in video encoders and video decoders. In particular, this application relates to scalable video coding (SVC), including SVC for Advanced Video Coding (AVC), and SVC for High Efficiency Video Coding (HEVC), also referred to as Scalable HEVC (SHVC), in addition to 3D and multi-view extensions to HEVC.

Background

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding processes, such as those described in the standards defined by MPEG-2, MPEG-4, ITU-T H.263, ITU-T H.264/MPEG-4, Part 10, Advanced Video Coding (AVC), the (HEVC standard presently under development, and extensions of such standards. The video devices may transmit, receive, encode, decode, and/or store digital video information more efficiently by implementing such types of video coding.

Video coding methods include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, 3D video bitstream may contain not only texture view components, but also depth view components. For example, each view may comprise one texture view component and one depth view component.

SUMMARY

In general, this disclosure describes methods and systems related to HEVC, including the multiview extension (MV-HEVC) and the scalable extension (SHVC) to HEVC. In specifying ranges for certain variables used in managing reference picture sets (RPS), HEVC currently employs a complicated derivation process as specified by a pseudo code. However, a part of the derivation process is incorrect and overall such a deviation process entails unnecessary complexity for encoders and decoders. This disclosure provides certain improvements to the determination of ranges for some variables to facilitate appropriate signaling between a video encoder and a video decoder. In particular, value ranges for the variables "num_negative_pics," "num_positive_pics," and "num_long_term_pics" can be improved.

The systems, methods and devices of this disclosure each have several innovative aspects, no single one of which is solely responsible for the desirable attributes disclosed herein.

One aspect of the disclosure provides a method for encoding video data. The method can include receiving a plurality of pictures, the plurality of pictures including a current picture and one or more reference pictures. The method can also include determining a reference picture set (RPS) for the current picture based at least in part on the one or more reference pictures. The method can also include determining a picture order count (POC) value of each reference picture of the one or more reference pictures in the RPS. The method can also include identifying at least one of a number of long-term reference pictures and a number of short-term reference pictures within the RPS. The method can also include applying constraints to the number of long-term pictures and the number of short-term pictures in the RPS, the constraints being based on the POC value and a maximum decoded picture buffer size minus one, if a video parameter set (VPS) extension is in use. The method can also include generating at least one syntax element identifying the RPS based on the constraints. The method can also include encoding the current picture based on the RPS and the at least one syntax element.

Another aspect of the disclosure provides a device for encoding video data. The device can have a memory configured to store a plurality of pictures. The plurality of pictures can have a current picture and one or more reference pictures. The device can also have at least one processor operably coupled to the memory. The at least one processor can determine a reference picture set (RPS) for the current picture based at least in part on the one or more reference pictures. The at least one processor can also determine a picture order count (POC) value of each reference picture of the RPS. The at least one processor can also identify at least one of a number of long-term reference pictures and a number of short-term reference pictures within the RPS. The at least one processor can also apply constraints to the number of long-term pictures and the number of short-term pictures in the RPS. The constraints can be based on the POC value and a maximum decoded picture buffer size minus one, if a video sequence parameter (VPS) extension is in use. The at least one processor can also generate at least one a syntax element identifying the RPS based on the constraints. The at least one processor can also encode the current picture based on the RPS and the at least one syntax element.

Another aspect of the disclosure provides a method for decoding video data. The method can include obtaining a picture order count (POC) of a current picture and POC values for one or more reference pictures from a bitstream. The method can also include determining a reference picture set (RPS) having the one or more reference pictures based on the POC values of the current picture and the POC values of the one or more reference pictures. The method can also include identifying the one or more reference pictures in the RPS as at least one of a number of long-term pictures and a number of short-term pictures, the number of long-term pictures and the number of short-term pictures being based on constraints, the constraints being based on the POC value and a maximum decoded picture buffer size minus one, if a video parameter set (VPS) extension is in use. The method can also include decoding the current picture based on the RPS.

Another aspect of the disclosure provides a device for decoding video data. The device can include a memory configured to store a current picture, a picture order count (POC) of a current picture, and POC values for one or more reference pictures from a bitstream, the POC values and the current picture being obtained from a bitstream. The device can also have a processor operably coupled to the memory. The processor can determine a reference picture set (RPS) having the one or more reference pictures based on the POC values of the current picture and the POC values of the one or more reference pictures. The processor can also identify the one or more reference pictures in the RPS as at least one of a number of long-term pictures and a number of short-term pictures, the number of long-term pictures and the number of short-term pictures being based on constraints, the constraints being based on the POC value and a maximum decoded picture buffer size minus one, if a video parameter set (VPS) extension is in use. The processor can also decode the current picture based on the RPS.

Other features and advantages of the present invention should be apparent from the following description which illustrates, by way of example, aspects of the invention.

DESCRIPTION OF THE DRAWINGS

The details of embodiments of the present invention, both as to their structure and operation, may be gleaned in part by study of the accompanying drawings, in which like reference numerals refer to like parts, and in which.

DETAILED DESCRIPTION

Figure 1:
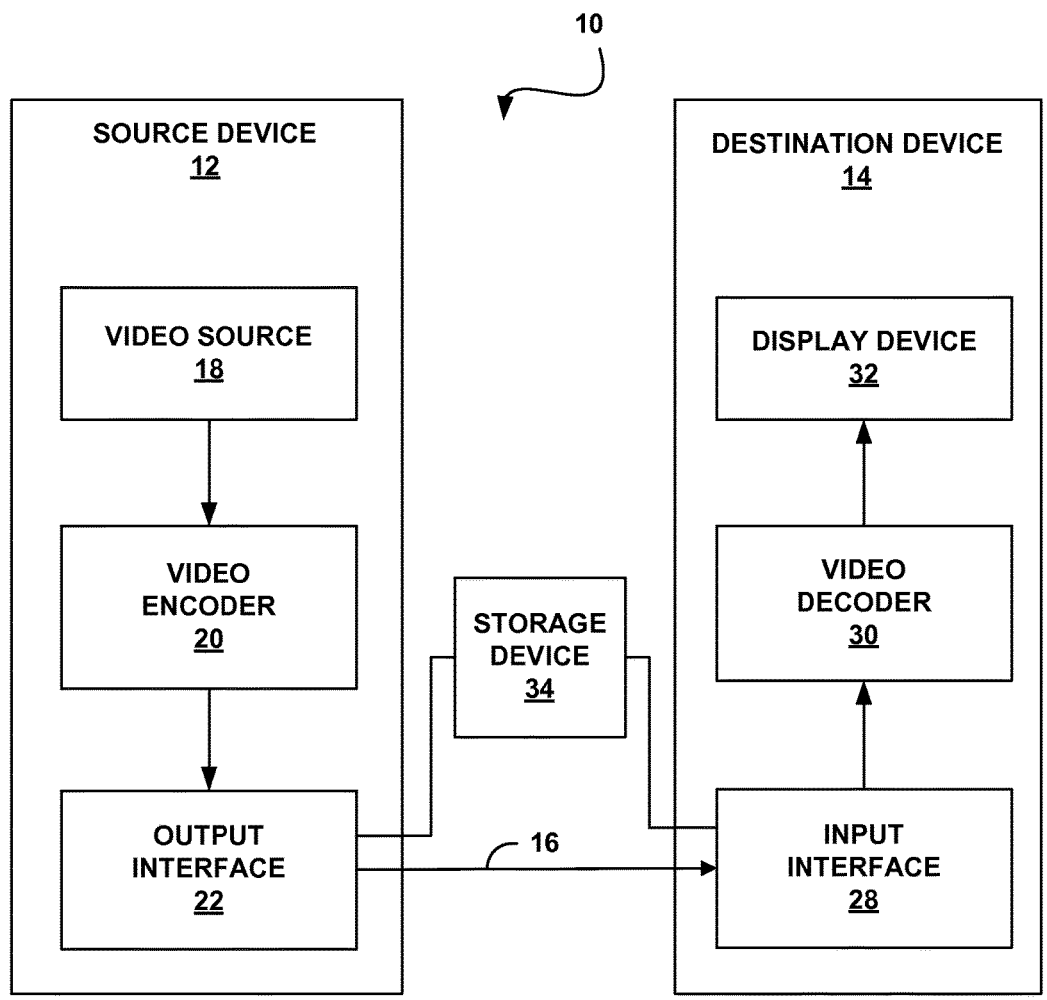
FIG. 1 is a functional block diagram of a video coding system.

The disclosure provides systems and methods of coding that may include one or more of several improvements in multi-layer video coding, including methods for improving the specification of the value ranges of certain syntax elements for encoding video data. In particular, certain improvements to the value ranges of the syntax elements num_negative_pics, num_positive_pics, and num_long_term_pics are suggested herein. In HEVC, the value ranges of the syntax elements "num_negative_pics," "num_positive_pics," and "num_long_term_pics" are specified based on a variable "maxNumPics," which is derived according to a complicated process as specified by a pseudo code. However, if a short-term reference picture set is included in a sequence parameter set (SPS), the nuh_layer_id used in the pseudo code for derivation of maxNumPics is incorrect, as it should be nuh_layer_id of a layer referring to the SPS instead of nuh_layer_id of the SPS. Furthermore, even after this problem is fixed, the derivation process as specified by the pseudo code imposes unnecessary complexity for conformance checking by encoders or decoders.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

FIG. 1 is a functional block diagram of a video coding system. A video coding system ("system") 10 that may utilize methods in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, the system 10 includes a source device 12 that can generate encoded video data to be decoded at a later time by a destination device 14. The source device 12 and the destination device 14 can comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

The destination device 14 may receive the encoded video data to be decoded via a link 16. The link 16 may comprise any type of medium or device capable of moving the encoded video data from the source device 12 to the destination device 14. In one example, the link 16 may comprise a communication medium to enable source device 12 to transmit encoded video data directly to the destination device 14 in real-time. The source device 12 may modulate the encoded video data according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Encoded data may be output from the output interface 22 to a storage device 34. Similarly, encoded data may be accessed from the storage device 34 by the input interface. The storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 34 may correspond to a file server or another intermediate storage device that may hold the encoded video generated by the source device 12. The destination device 14 may access stored video data from the storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 may be a streaming transmission, a download transmission, or a combination of both.

The methods of this disclosure are not necessarily limited to wireless applications or settings. The methods may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, the source device 12 includes a video source 18, video encoder 20, and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, the source device 12 and destination the device 14 may form so-called camera phones or video phones. However, the methods described in this disclosure may be applicable to video coding in general, and may be applied to wireless and/or wired applications.

The video encoder 20 may encode the captured, pre-captured, or computer-generated video. Additionally, in some embodiments, the video decoder 30 may differentiate between a first bitstream and a second bitstream based on the parameter set ID of the first bitstream and the unique parameter set ID. In other examples, output interface 22 of the source device 12 may transmit the encoded video data directly to the destination device 14 via the link 16. The encoded video data may also (or alternatively) be stored onto the storage device 34 for later access by the destination device 14 or other devices, for decoding and/or playback.

The destination device 14 includes an input interface 28, a video decoder 30, and a display device 32. In some cases, the input interface 28 may include a receiver and/or a modem. The input interface 28 of the destination device 14 receives the encoded video data over the link 16. The encoded video data communicated over the link 16, or provided on the storage device 34, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. If the methods are implemented partially in software, a device may store instructions for the software in a suitable, non-transitory computer-readable medium and execute the instructions in hardware using one or more processors to perform the methods of this disclosure. Each of the video encoder 20 and the video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs can be sized based on the size of PUs within a given CU defined for a partitioned LCU, although this may not always be the case. The TUs can be the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, the video encoder 20 may calculate residual values corresponding to the PU. The residual values comprise pixel difference values that may be transformed into transform coefficients, quantized, and scanned using the TUs to produce serialized transform coefficients for entropy coding. As used herein, the term "video block" may generally refer to a coding node of a CU. In some specific cases, this disclosure may also use the term "video block" to refer to a treeblock, i.e., LCU, or a CU, which includes a coding node and PUs and TUs.

The video encoder 20 can generate a bitstream that includes encoded video data. The bitstream can include a series of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. The NAL units of the bitstream may include video coding layer (VCL) NAL units and non-VCL NAL units. The VCL NAL units can include coded slices of pictures.

A non-VCL NAL unit may include a VPS, a sequence parameter set (SPS), a picture parameter set (PPS), SEI, or other types of data. A VPS is a syntax structure that may contain syntax elements that apply to zero or more entire coded video sequences. A SPS is a syntax structure that may contain syntax elements that apply to zero or more entire coded video sequences. A single VPS may be applicable to multiple SPSs. A PPS is a syntax structure that may contain syntax elements that apply to zero or more entire coded pictures. A single SPS may be applicable to multiple PPS's. Various aspects of the VPS, SPS, and PPS may be formed, in general, as defined by the HEVC standard. The video encoder 20 may use SEI messages to include, in the bitstream, metadata that is not required for correct decoding of the sample values of pictures. However, video decoder 30 or other devices may use the metadata included in SEI messages for various other purposes. For example, the video decoder 30 may use the metadata in SEI messages for picture output timing, picture displaying, loss detection, and error concealment.

Figure 2:
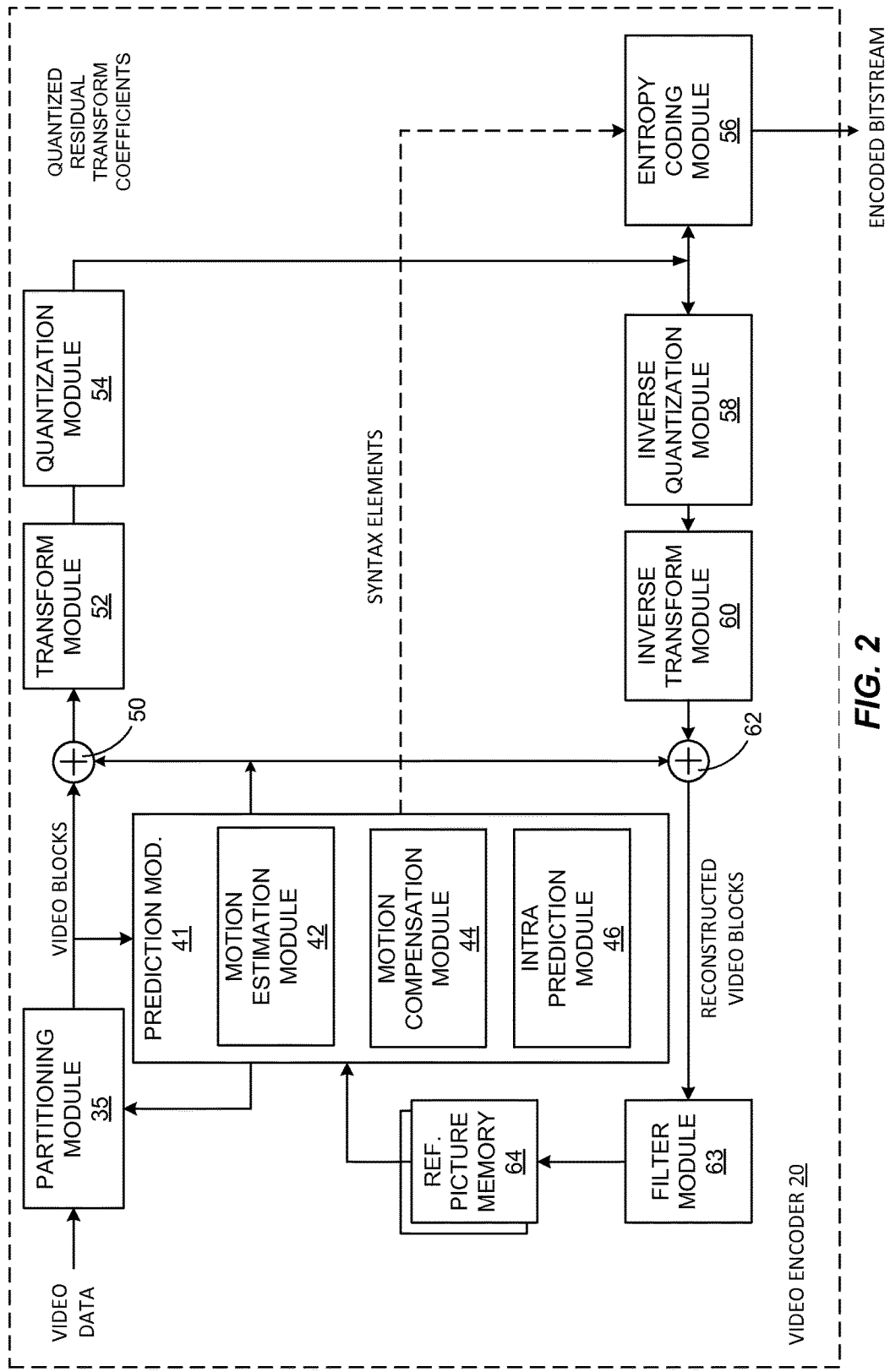
FIG. 2 is a functional block diagram of the video encoder of FIG. 1.

FIG. 2 is a functional block diagram of the video encoder of FIG. 1. The video encoder 20 can include a partitioning module 35 configured to receive captured video data and partition the video data into video blocks. The partitioning module 35 can partition the video data into slices, tiles, or other larger units. The partitioning module 35 can also partition video blocks, e.g., according to a quadtree structure of LCUs and CUs. The video encoder 20 may divide the slice into multiple video blocks (and possibly into sets of video blocks referred to as tiles).

The video encoder 20 can also have a prediction module 41 operably coupled to the partitioning module 35 and configured to receive the partitioned video data. The prediction module 41 can select one of a plurality of possible coding modes, such as one of a plurality of intra coding modes or one of a plurality of inter coding modes, for the current video block based on error results (e.g., coding rate and the level of distortion). The prediction module 41 can allow the video encoder 20 to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The prediction module 41 can include a motion estimation module 42, a motion compensation module 44, and an intra-prediction module 46. Each of these components can be operably connected or integrated in one or more processors within the video encoder 20. While discussed separately for conceptual purposes, the motion estimation module 42, the motion compensation module 44, and the intra-prediction module 46 can be highly integrated.

The motion estimation module 42 can be configured to determine the inter-prediction mode for a video slice according to a predetermined pattern for a video sequence. Such inter-prediction or inter-predictive coding of the current video block relative to one or more predictive blocks in one or more reference pictures can provide temporal compression. The predetermined pattern may designate video slices in the sequence as P slices, B slices or GPB slices. Motion estimation, as used herein, may generally refer to the process of generating motion vectors, which estimate motion for video blocks. A motion vector, for example, may indicate the displacement of a PU of a video block within a current video frame or picture relative to a predictive block within a reference frame or reference picture. The reference frames can be stored in a reference picture memory 64 operably coupled to the prediction module 41. The reference frame memory 64. The reference frame memory 64 can store reconstructed coding blocks after a filter module 63 performs deblocking operations on the reconstructed coding blocks. The reference frame memory 64 can thus also operate as a decoded picture buffer (DPB).

A predictive block is a block that is found to closely match the PU of the video block to be coded in terms of pixel difference, which may be determined by sum of absolute difference (SAD), sum of square difference (SSD), or other difference metrics. In some examples, the motion prediction module ("prediction module") 41 can calculate values for sub-integer pixel positions of reference pictures stored in the reference picture memory 64. For example, the prediction module 41 can interpolate values of one-quarter pixel positions, one-eighth pixel positions, or other fractional pixel positions of the reference picture. Therefore, the motion estimation module 42 may perform a motion search relative to the full pixel positions and fractional pixel positions and output a motion vector with fractional pixel precision.

The motion estimation module 42 can calculate a motion vector for a PU of a video block in an inter-coded slice by comparing the position of the PU to the position of a predictive block of a reference picture. The reference picture can be selected from a first reference picture list (List 0) or a second reference picture list (List 1), each of which identify one or more reference pictures stored in the reference picture memory 64. The motion estimation module 42 can send the calculated motion vector to the motion compensation module 44 and an entropy encoding module 56.

Motion compensation can involve fetching or generating the predictive block based on the motion vector determined by motion estimation. This can include interpolations to sub-pixel precision. Upon receiving the motion vector for the PU of the current video block, the motion compensation module 44 can locate the predictive block to which the motion vector points in one of the reference picture lists. The motion compensation module 44 can also generate syntax elements associated with the video blocks and the video slice for use by the video decoder 30 in decoding the video blocks of the video slice.

The intra-prediction module 46 of the prediction module 41 can perform intra-predictive coding of the current video block relative to one or more neighboring blocks in the same frame or slice to provide spatial compression. The intra-prediction module 46 can intra-predict a current block, as an alternative to the inter-prediction performed by the motion estimation module 42 and the motion compensation module 44, as described above. In particular, the intra-prediction module 46 can determine an intra-prediction mode to use to encode a current block. In some examples, the intra-prediction module 46 can encode a current block using various intra-prediction modes, e.g., during separate encoding passes. For example, the intra-prediction module 46 may calculate rate-distortion values using a rate-distortion analysis for the various tested intra-prediction modes, and select the intra-prediction mode having the best rate-distortion characteristics among the tested modes. Rate-distortion analysis can determine an amount of distortion (or error) between an encoded block and an original, unencoded block that was encoded to produce the encoded block, as well as a bit rate (that is, a number of bits) used to produce the encoded block. The intra-prediction module 46 may calculate ratios from the distortions and rates for the various encoded blocks to determine which intra-prediction mode exhibits the best rate-distortion value for the block.

The intra-prediction module 46 can provide information indicative of the selected intra-prediction mode for the block to the entropy encoding module 56. The entropy encoding module 56 can encode the information indicating the selected intra-prediction mode. The video encoder 20 can include configuration data in the transmitted bitstream, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After the prediction module 41 generates the predictive block for the current video block via either inter-prediction or intra-prediction, the video encoder 20 forms a residual video block by subtracting the predictive block from the current video block. This process can result in pixel difference values. The pixel difference values form the residual data for the block, and can include both luma and chroma difference components. A summer 50, operably coupled to the prediction module 41 and the partitioning module 35, represents the component or components that can be configured to perform this subtraction operation.

The residual video data in the residual block may be included in one or more TUs and applied to a transform module 52 operably coupled to the summer 50. The transform module 52 can transform the residual video data into residual transform coefficients using a transform, such as a discrete cosine transform (DCT) or a conceptually similar transform. The transform module 52 can convert the residual video data from a pixel domain to a transform domain, such as a frequency domain. The prediction module 41 can provide the resulting intra- or inter-coded block to the summer 50 to generate residual block data. The resulting intra- or inter-coded block can further be provided a summer 62 to reconstruct the encoded block for use as a reference picture.

The video encoder 20 can also include the filter module 63 operably coupled to the summer 62. The filter module 63 can represent one or more loop filters such as a deblocking filter, an adaptive loop filter (ALF), and a sample adaptive offset (SAO) filter. Although filter module 63 is shown in FIG. 2 as being an in loop filter, in other configurations, the filter module 63 can be implemented as a post loop filter. The filter module 63 can provide reference pictures to the reference picture memory 64.

The transform module 52 can send the resulting transform coefficients to a quantization module 54. The quantization module 54 can quantize the transform coefficients to further reduce bit rate. The quantization process may reduce the bit depth associated with some or all of the coefficients. The degree of quantization may be modified by adjusting a quantization parameter. In some examples, the quantization module 54 can then perform a scan of the matrix including the quantized transform coefficients. In some embodiments, the entropy encoding module 56 may perform the scan.

Following quantization, the entropy encoding module 56 can entropy encode the quantized transform coefficients. For example, the entropy encoding module 56 may perform context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

Following the entropy encoding by the entropy encoding module 56, the encoded bitstream can be transmitted to the video decoder 30. The bitstream can also be archived for later transmission or retrieval by the video decoder 30. The entropy encoding module 56 can also entropy encode the motion vectors and the other syntax elements for the current video slice being coded.

The video encoder 20 can also include an inverse quantization module 58 operably coupled to the entropy encoding module 56. An inverse transform module 60 can also be operably coupled to the inverse quantization module 58 and the summer 62. The inverse quantization module 58 and the inverse transform module 60 can apply inverse quantization and inverse transformation, respectively, to reconstruct the residual block in the pixel domain for later use as a reference block of the reference picture. The motion compensation module 44 can calculate a reference block by adding the residual block to a predictive block of one of the reference pictures within one of the reference picture lists. The summer 62 can add the reconstructed residual block to the motion compensated prediction block produced by the motion compensation module 44 to produce a reference block for storage in the reference picture memory 64. The reference block can be used by the motion estimation module 42 and the motion compensation module 44 as a reference block to inter-predict a block in a subsequent video frame or picture.

In some examples, video encoder 20 generates a bitstream. The bitstream generated by the video encoder 20 may include multiple operation points that can be extracted as sub-bitstreams from the bitstream. The operation points may include, for example, multiple layers and/or views, as well as multiple frame rates. The video encoder 20 may encode information indicative of the output operation points in the VPS. In some examples, for each of the operation points that the video encoder 20 signals in the VPS associated with the bitstream, an operation point syntax structure specifies a set of layer identifiers (IDs) used to identify NAL units in the bitstream that belong to a sub-bitstream of a given operation point. In this way, NAL units that make up the sub-bitstream of the given operation point may be extracted from the original bitstream based on the layer identifiers of the NAL units.

Figure 3:
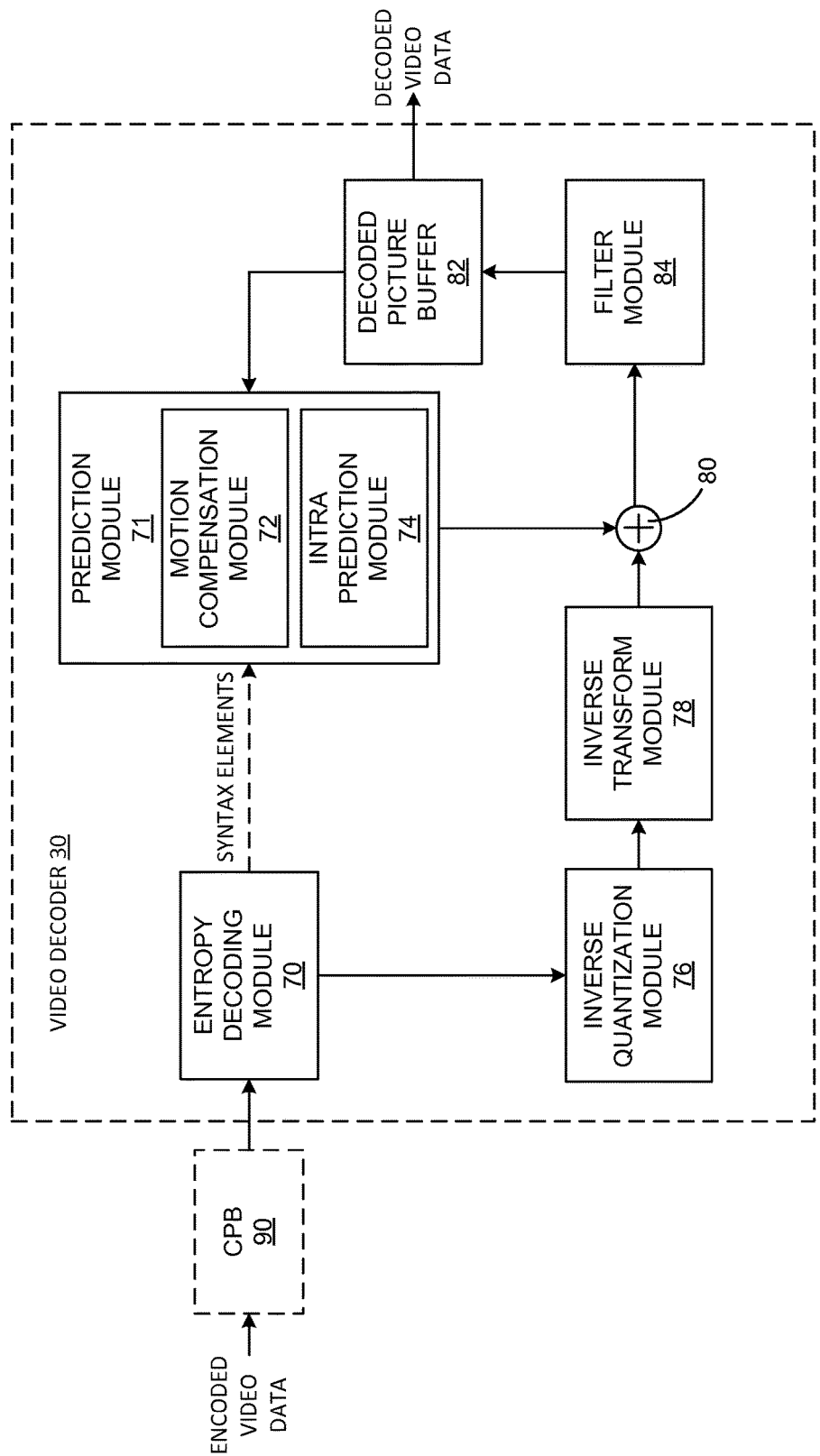
FIG. 3 is a functional block diagram illustrating the video decoder of FIG. 1.

FIG. 3 is a block diagram illustrating the video decoder of FIG. 1. For purposes of explanation, this disclosure describes video decoder 30 in the context of HEVC coding. However, this disclosure may be applicable to other coding standards or methods.

The video decoder 30 can include an entropy decoding module 70, a prediction module 71, an inverse quantization module 76, an inverse transform module 78, a summer 80, a filter module 84, and a decoded picture buffer (DPB) 82. The prediction module 71 can include a motion compensation module 72 and an intra-prediction module 74. In other examples, the video decoder 30 can include more, fewer, or different functional components.

A coded picture buffer (CPB) 90 may receive and store encoded video data (e.g., NAL units) of a bitstream. The entropy decoding module 70 may receive NAL units from CPB 90 and parse the NAL units to decode syntax elements. The entropy decoding module 70 can entropy decode entropy-encoded syntax elements in the NAL units. The prediction module 71, the inverse quantization module 76, the inverse transform module 78, the summer 80, and the filter module 84 can generate decoded video data based on the syntax elements extracted from the bitstream.

The NAL units of the bitstream may include coded slice NAL units. As part of decoding the bitstream, the entropy decoding module 70 can extract and entropy decode syntax elements from the coded slice NAL units. Each of the coded slices can include a slice header and slice data. The slice header can contain syntax elements pertaining to a slice. The syntax elements in the slice header can include a syntax element that identifies a PPS associated with a picture that contains the slice.

In addition to decoding syntax elements from the bitstream, the video decoder 30 may perform a reconstruction operation on a non-partitioned CU. To perform the reconstruction operation on a non-partitioned CU, the video decoder 30 can perform a reconstruction operation on each TU of the CU. By performing the reconstruction operation for each TU of the CU, the video decoder 30 may reconstruct residual blocks of the CU.

As part of performing a reconstruction operation on a TU of a CU, inverse quantization module 76 can inverse quantize, i.e., de-quantize, coefficient blocks associated with the TU. Inverse quantization module 76 may use a quantization parameter (QP) value associated with the CU of the TU to determine a degree of quantization and, likewise, a degree of inverse quantization for inverse quantization module 76 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization module 76 inverse quantizes a coefficient block, inverse transform module 78 may apply one or more inverse transforms to the coefficient block in order to generate a residual block associated with the TU. For example, inverse transform module 78 may apply an inverse DCT, an inverse integer transform, an inverse directional transform, or another inverse transform to the coefficient block.

If a PU is encoded using intra prediction, intra-prediction module 74 can perform intra-prediction to generate predictive blocks for the PU. Intra-prediction module 74 may use an intra-prediction mode to generate the predictive luma, Cb and Cr blocks for the PU based on the prediction blocks of spatially-neighboring PUs. Intra-prediction module 74 may determine the intra prediction mode for the PU based on one or more syntax elements decoded from the bitstream.

The prediction module 71 can construct a first reference picture list (RefPicList0) and a second reference picture list (RefPicList1) based on syntax elements extracted from the bitstream. Furthermore, if a PU is encoded using inter prediction, entropy decoding module 70 may extract motion information for the PU. The motion compensation module 72 may determine, based on the motion information of the PU, one or more reference regions for the PU. The motion compensation module 72 can generate predictive luma, Cb and Cr blocks for the PU-based on samples blocks at the one or more reference blocks for the PU.

The summer 80 can use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, the summer 80 can add samples of the luma, Cb and Cr transform blocks to corresponding samples of the predictive luma, Cb and Cr blocks to reconstruct the luma, Cb and Cr coding blocks of the CU.

The filter module 84 can be a deblocking filter, for example, and perform a deblocking operation to reduce blocking artifacts associated with the luma, Cb and Cr coding blocks of the CU. The video decoder 30 can then store the luma, Cb and Cr coding blocks of the CU in decoded picture buffer 82. The decoded picture buffer 82 can provide reference pictures for subsequent motion compensation, intra prediction, and presentation on a display device, such as display device 32 of FIG. 1. For example, the video decoder 30 can perform intra prediction or inter prediction operations on PUs of other CUs based on the luma, Cb and Cr blocks in decoded picture buffer 82. Thus, the video decoder 30 can decode, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Reference Picture Sets

HEVC specifies certain variables in the parameter sets for use in decoding coded video data. A reference picture set (RPS) is set of reference pictures associated with a picture, comprising all reference pictures that are prior to the associated picture in decoding order, that may be used for inter prediction of the associated picture or any picture following the associated picture in decoding order. A reference picture contains samples that may be used for inter prediction in the decoding process of subsequent pictures in decoding order.

In HEVC, an RPS for each coded picture is directly signaled. Syntax elements for signaling of the RPS are included in both the sequence parameter set (SPS) and the slice header. For a particular coded picture, the RPS may be one of the alternative sets included in the SPS as indicated by a flag in the slice header, or directly signaled in the slice header.

The reference picture set for each picture may include five different lists of reference pictures, also referred to as the five RPS subsets: RefPicSetStCurrBefore, RefPicSetStCurrAfter, RefPicSetStFoll, RefPicSetLtCurr, and RefPicSetLtFoll. RefPicSetStCurrBefore includes short-term reference pictures (STRPs) that are prior to the current picture in both decoding order and output order, and that may be used in inter prediction of the current picture. RefPicSetStCurrAfter includes short-term reference pictures that are prior to the current picture in decoding order, that succeed the current picture in output order, and that may be used in inter prediction of the current picture. RefPicSetStFoll includes short-term reference pictures that may be used in inter prediction of one or more of the pictures following the current picture in decoding order, and that are not used in inter prediction of the current picture. RefPicSetLtCurr includes long-term reference pictures that may be used in inter prediction of the current picture. RefPicSetLtFoll includes long-term reference pictures (LTRPs) that may be used in inter prediction of one or more of the pictures following the current picture in decoding order, and that are not used in inter prediction of the current picture.

The RPS concept for reference picture management in HEVC is fundamentally different from the reference picture management of previous video coding standards. Instead of signaling relative changes to the DPB 82 (FIG. 3), the status of the DPB 82 is signaled in every slice. Such a process can provide a basic level of error robustness in all standard-conforming (e.g., HEVC) bitstreams and decoders.

HEVC defines a hypothetical reference decoder (HRD), which models the video decoder 30 and describes the usage of the CPB 90 and the DPB 82, (FIG. 3). The CPB 90 and DPB 82 can further be components of a reference frame memory, similar to the reference frame memory 64 (FIG. 2). The decoding order of coded pictures is the same as the order in which the coded pictures occur in the bitstream. HEVC further supports an output order of decoded pictures that is different from the decoding order of the pictures. Each picture is associated with a picture order count (POC) value that represents the output order. POC is a variable associated with each picture, uniquely identifies the associated picture among all pictures in the CVS, and, when the associated picture is to be output from the decoded picture buffer, indicates the position of the associated picture in output order relative to the output order positions of the other pictures in the same CVS that are to be output from the DPB 82.

There are two types of reference pictures: short-term and long-term. A reference picture can also be marked as "unused for reference" when it becomes no longer needed for prediction reference. Assigning one of these markings to a picture implicitly removes another of these markings when applicable. When a picture is referred to as being marked as "used for reference," this collectively refers to the picture being marked as "used for short-term reference" or "used for long-term reference" (but not both). The conversion among these three statuses (short-term, long-term, and unused for reference) is controlled by the decoded reference picture marking process. In HEVC, the RPS is first decoded from a slice header of the current picture, then picture marking and buffer operations are applied before decoding the current picture.

High Level Syntax

The NAL units can contain syntax elements encoded by the video encoder 20 and transmitted to the video decoder 30. The syntax elements that describe the structure of the bitstream or provide information that applies to multiple pictures or to multiple coded block regions within a picture, such as the parameter sets (e.g., SPS, VPS, PPS, etc.), reference picture management syntax, and SEI messages, are known as "high-level syntax" (HLS) part of HEVC.

In particular, HEVC employs the parameter set structure, relevant to this disclosure. Parameter sets contain information that can be shared for the decoding of several regions of the decoded video. The parameter set structure provides a robust mechanism for conveying data that are essential to the decoding process.

Slice Segment Header Semantics

Each slice header in HEVC includes parameters for signaling of the RPS for the picture containing the slices. The short-term part of an RPS, also referred to herein as short-term RPS, may be included directly in the slice header or, the slice header may contain only a syntax element which represents an index, referencing to a predefined list of RPSs sent in the active SPS.

In some examples, HEVC specifies certain value ranges for the syntax elements num_negative_pics, num_positive_pics, and num_long_term_pics based on a variable maxNumPics, which is derived according to a complicated process as specified by a pseudo code. For example, the following pseudo code can be used to the derive maxNumpics:

```
maxNumPics = MaxDpbSize - 1
for( olsIdx = 0; olsIdx < NumOutputLayerSets; olsIdx++) {
    lsIdx = OlsIdxToLsIdx[ olsIdx ]
    for( j = 0; j < NumLayersInIdList[ lsIdx ]; j++ )
        if( LayerSetLayerIdList[ lsIdx ][ j ] == nuh_layer_id ) {
            maxSL = MaxSubLayersInLayerSetMinus1[ lsIdx ]
            maxNumPics = Min( maxNumPics,
    max_vps_dec_pic_buffering_minus1[ olsIdx ][ j ][ maxSL ] )
        }
}
```

However, when the short-term reference picture set is included in an SPS, the nuh_layer_id used in the pseudo code for derivation of maxNumPics is incorrect. Instead, the nuh_layer_id used in the pseudo code for derivation of maxNumPics should be the nuh_layer_id of a layer referring to the SPS instead of nuh_layer_id of the SPS.

In some embodiments then, one more loop of nuh_layer_id values for all the layers that refer to the SPS, may be needed to correctly reference the nuh_layer_id. For example, an additional line such as, for (i=0; i<number of all the layers; i++), may be needed in addition to replacing "nuh_layer_id" in the code with nuhLayerId[i] (where "i" is a counter, similar to "j" in the above pseudo code), to correctly define the maxNumpics variable. Furthermore, even after the above problem is fixed, the derivation process specified by the pseudo code imposes unnecessary complexity for conformance checking by encoders or decoders, negatively impacting conformance testing.

Long Term Reference Pictures

Long term reference pictures are marked as used for long-term reference when stored in the DPB 82. There are reference pictures that contain samples that may be used for inter prediction in the decoding process of subsequent pictures in decoding order. Long-term reference pictures are directly signaled in the sliced header with the variable num_long_term_pics, specifying the number of entries in the RPS of the current picture. If no value is found in the slice header, the value is assumed to be zero.

The RPS is dependent on a number of variables defined in the semantics of the HEVC standard. For example, the variable num_negative_pics (i.e., number of negative pictures) refers to a number of entries in the short-term RPS that have a POC less than that of the POC count of the current picture. The variable num_positive_pics (i.e., number of positive pictures) refers to the number of entries in the short-term RPS that have a POC greater than the POC value of the current picture. The variable num_long_term_sps (i.e., number of long term SPS) refers to the number of entries in the long-term RPS of the current picture that are derived based on the candidate long-term reference pictures specified in the active SPS. The variable num_long_term_pics refers to the number of entries in the long-term RPS of the current picture that are directly signaled in the slice header.

In some embodiments, in order to address the concerns noted above, certain value ranges for these syntax elements can be improved to more accurately reflect requirements of the RPS and the HRD. The general slice segment header semantics can be improved as noted below. Ellipses indicate portions that have been removed in interest of brevity, but do not affect the disclosure. For example:

. . .

num_long_term_pics specifies the number of entries in the long-term RPS of the current picture that are directly signalled in the slice header. When not present, the value of num_long_term_pics is inferred to be equal to 0.

When nuh_layer_id is equal to 0, the sum of NumNegativePics[CurrRpsIdx], NumPositivePics[CurrRpsIdx], num_long_term_sps, and num_long_term_pics shall be less than or equal to sps_max_dec_pic_buffering_minus1[sps_max_sub_layers_minus1]. When vps_extension_flag is equal to 1, the sum of NumNegativePics[CurrRpsIdx], NumPositivePics[CurrRpsIdx], num_long_term_sps, and num_long_term_pics shall be less than or equal to MaxDpbSize−1.

. . .

In some embodiments, this improvement eliminates the use of the variable "maxNumPics" from the semantics of num_long_term_pics. Accordingly, the process for deriving "maxNumPics" can also be eliminated. The process instead relies on the maximum size of the decoded picture buffer (e.g., the DPB 82), or the variable MaxDpbSize−1. As used herein MaxDpbSize is the maximum decoded picture buffer size.

Short-Term Reference Pictures

A short-term reference picture set can have a syntax structure, st_ref_pic_set (stRpsIdx). The st_ref_pic_set (stRpsIdx) syntax structure may be present in an SPS or in a slice header. If present in a slice header, the st_ref_pic_set (stRpsIdx) syntax structure specifies the short-term RPS of the current picture (e.g., the picture containing the slice). Additionally, the following is also required: 1) the content of the st_ref_pic_set(stRpsIdx) syntax structure shall be the same in all slice headers of the current picture; 2) the value of stRpsIdx shall be equal to the syntax element num_short_term_ref_pic_sets in the active SPS; and 3) the short-term RPS of the current picture is also referred to as the num_short_term_ref_pic_sets-th candidate short-term RPS in the semantics specified in the remainder of this clause.

In some examples, many of the variables described above also apply equally to the short-term RPS.

If not present in a slice header and otherwise present in an SPS, the st_ref_pic_set(stRpsIdx) syntax structure specifies a candidate short term (e.g., ST) RPS. Further, the term "current picture," as used in the semantics, refers to each picture that has short_term_ref_pic_set_idx (i.e., short-term RPS index) equal to stRpsIdx in a CVS that has the SPS as the active SPS.

The short-term reference picture set semantics can be improved as follows:

. . .

num_negative_pics specifies the number of entries in the stRpsIdx-th candidate short-term RPS that have a picture order count values less than the picture order count value of the current picture. When nuh_layer_id is equal to 0, the value of num_negative_pics shall be in the range of 0 to sps_max_dec_pic_buffering_minus1[sps_max_sub_layers_minus1], inclusive. When vps_extension_flag is equal to 1, the value of num_negative_pics shall be in the range of 0 to MaxDpbSize−1, inclusive.

num_positive_pics specifies the number of entries in the stRpsIdx-th candidate short-term RPS that have picture order count values greater than the picture order count value of the current picture. When nuh_layer_id is equal to 0, the value of num_positive_pics shall be in the range of 0 to sps_max_dec_pic_buffering_minus1[sps_max_sub_layers_minus1]−num_negative_pics, inclusive. When vps_extension_flag is equal to 1, the value of num_positive_pics shall be in the range of 0 to MaxDpbSize−1−num_negative_pics, inclusive.

. . .

In a similar manner to above, such an improvement removes the process previously used for deriving the variable maxNumPics and relies on the maximum DPB size (MaxDpbSize) minus one for the range of values.

Figure 4:
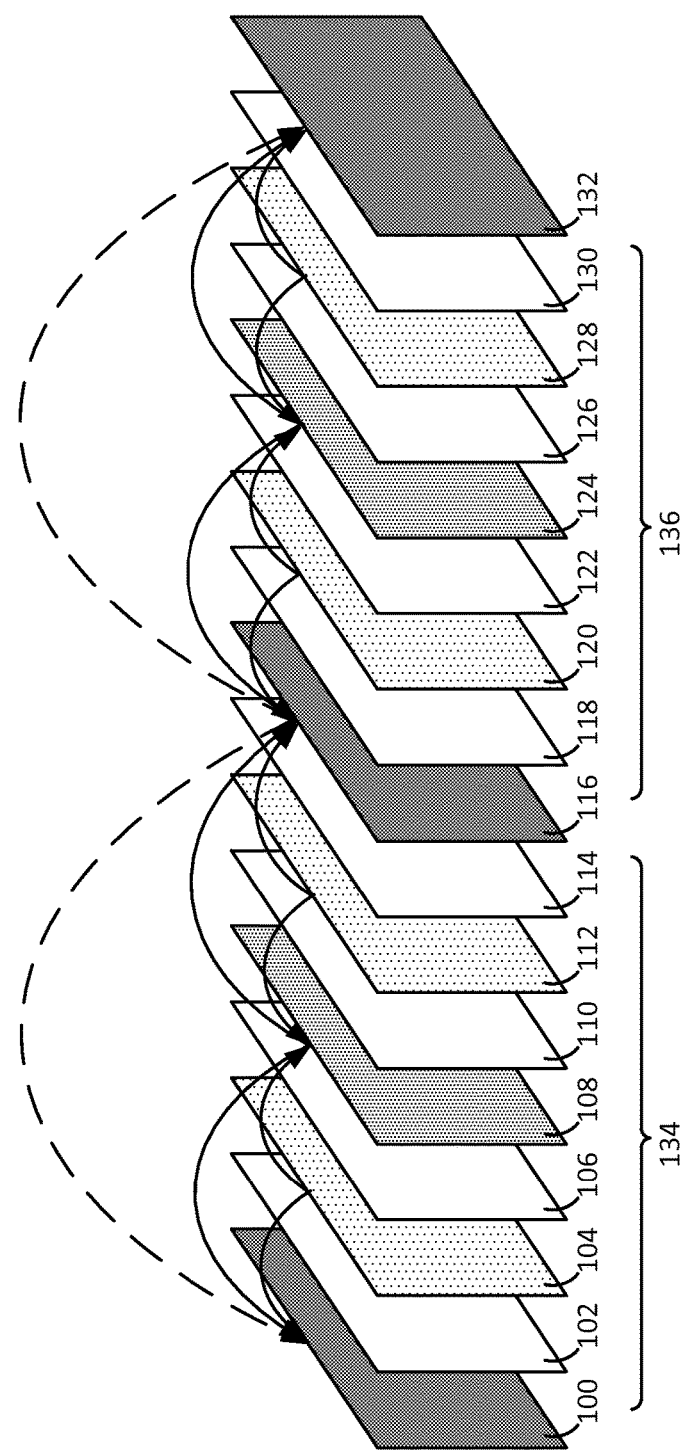
FIG. 4 is a is a conceptual diagram illustrating a sequence of coded video pictures.

FIG. 4 is a conceptual diagram illustrating a sequence of coded video pictures. The pictures are shaded differently to indicate positions within a hierarchical prediction structure. For example, pictures 100, 116, and 132 are shaded dark gray to represent that the pictures 100, 116, 132 are at the top of the hierarchical prediction structure. The pictures 100, 116, 132 may comprise, for example, intra-coded pictures or inter-coded pictures that are predicted from other pictures in a single direction (e.g., P-pictures). When intra-coded, pictures 100, 116, 132 are predicted solely from data within the same picture. When inter-coded, the picture 116, for example, may be coded relative to data of picture 100, as indicated by the dashed arrow from picture 116 to picture 100. The pictures 116, 132 form key pictures of groups of pictures (GOPs) 134, 136, respectively.

Pictures 108, 124 are shaded medium gray to indicate that they are next in the encoding hierarchy following pictures 100, 116, and 132. The pictures 108, 124 can comprise bi-directional, inter-mode prediction encoded pictures. For example, the picture 108 may be predicted from data of pictures 100 and 116, while picture 124 may be predicted from pictures 116 and 132. Pictures 104, 112, 120, and 128 are shaded light gray to indicate that they are next in the encoding hierarchy following pictures 108 and 124. Pictures 104, 112, 120, and 128 may also comprise bi-directional, inter-mode prediction encoded pictures. For example, the picture 104 can be predicted from pictures 100 and 108, the picture 112 can be predicted from pictures 108 and 116, picture 120 may be predicted from picture 116 and 124, and picture 128 may be predicted from picture 124 and 132. In general, pictures that are lower in the hierarchy may be encoded from any reference pictures that are higher in the hierarchy, assuming that the reference pictures are still buffered in a decoded picture buffer, and assuming that the reference pictures were coded earlier than the picture currently being coded.

Pictures 102, 106, 110, 114, 118, 122, 126, and 130 are colored white to indicate that these pictures are last in the encoding hierarchy. The pictures 102, 106, 110, 114, 118, 122, 126, and 130 may be bi-directional, inter-mode prediction encoded pictures. The picture 102 may be predicted from pictures 100 and 104, picture 106 may be predicted from pictures 104 and 108, picture 110 may be predicted from pictures 108 and 112, picture 114 may be predicted from pictures 112 and 116, picture 118 may be predicted from picture 116 and 120, picture 122 may be predicted from pictures 120 and 124, the picture 126 may be predicted from pictures 124 and 128, and the picture 130 may be predicted from pictures 128 and 132. It should be understood that pictures lower in the coding hierarchy can be coded from other pictures that are higher in the coding hierarchy. For example, any or all of the pictures 102, 106, 110, or 114 can be predicted relative to any of pictures 100, 116, or 108, in addition or in the alternative.

The pictures 100-132 are illustrated in display order. That is, following decoding, picture 100 is displayed before picture 102, the picture 102 is displayed before the picture 104, and so on. As discussed above, POC values generally describe a display order for pictures, which is also substantially the same as the order in which raw pictures were captured or generated prior to being encoded. However, due to the encoding hierarchy, the pictures 100-132 may be decoded in a different order. Moreover, while being encoded, the pictures 100-132 can be arranged in decoding order in a bitstream including encoded data for the pictures 100-132. For example, picture 116 may be displayed last among pictures of GOP 134. However, due to the encoding hierarchy, picture 116 may be decoded first of GOP 134. That is, in order to properly decode picture 108, for example, picture 116 may need to be decoded first, in order to act as a reference picture for picture 108. Likewise, picture 108 may act as a reference picture for the pictures 104, 106, 110, and 112, and therefore may need to be decoded before the pictures 104, 106, 110, and 112.

Furthermore, certain pictures may be treated as long-term reference pictures, while other pictures may be treated as short-term reference pictures. For example, the pictures 100 and 116 can represent long-term reference pictures, while the pictures 108, 104, and 112 represent short-term reference pictures. It may be the case, in this example, that the pictures 102 and 106 can be predicted relative to any of the pictures 100, 116, 108, or 104, but that the pictures 110 and 114 can be predicted relative to any of the pictures 100, 116, 108, or 112. In other words, the picture 104 may not be available for reference when coding the pictures 110 and 114. As another example, assuming that the pictures 100 and 116 represent long-term reference pictures and the pictures 108, 104, and 112 represent short-term reference pictures, the pictures 108, 104, and 112 may not be available for reference when coding the pictures 118, 122, 126, and 130.

In some examples, the number of long-term reference pictures in the RPS can be constrained in order to conform to a coding standard (e.g., HEVC). For example, the number of pictures can be constrained within a finite set of values. These values or value ranges can generally be referred to herein as constraints. In some embodiments, such finite set of values or constraints can be an integer value. In some other embodiments, the finite set of values can be based on a buffer size or a maximum memory size, as described below. In some examples, value ranges can be constrained to enable encoders and decoders to allocate a finite number of bits for variables used to represent the syntax elements. Once the value ranges are specified, the constraints are followed as a part of conformance testing. In some other examples, the maximum size of the RPS is directly limited by other means, however, it can also be indirectly limited by the value ranges for the related syntax elements.

As noted above, the variable num_long_term_pics specifies the number of entries in the long-term RPS of the current picture that are directly signaled in the slice header. When not present in the slice header, the value of num_long_term_pics is inferred to be equal to 0. Additionally, in the base layer (nuh_layer_id equals zero), the sum of NumNegativePics[CurrRpsIdx], NumPositivePics[CurrRpsIdx], num_long_term_sps, and num_long_term_pics shall be less than or equal to sps_max_dec_pic_buffering_minus1[sps_max_sub_layers_minus1]. When vps_extension_flag is equal to, the sum of NumNegativePics[CurrRpsIdx], NumPositivePics[CurrRpsIdx], num_long_term_sps, and num_long_term_pics shall be less than or equal to MaxDpbSize−1. In some examples, the "vps_extension_flag is equal to 1" term can indicate that the VPS extension is in used and there is at least one layer present that is not the base layer.

The number of short-term pictures in the RPS can also be constrained. The short-term pictures (e.g., st_ref_pic_set( ) syntax structure) can include the syntax elements, or variables, num_negative_pics and num_positive_pics. In order to conform to the coding standards (e.g., HEVC) these variables can also be constrained within certain limits. For example, as noted above, num_negative_pics specifies the number of entries in the stRpsIdx-th candidate short-term RPS that have picture order count values less than the picture order count value of the current picture. When nuh_layer_id is equal to 0, as in the base layer, the value of num_negative_pics shall be in the range of zero to sps_max_dec_pic_buffering_minus1[sps_max_sub_layers_minus1], inclusive. When vps_extension_flag is equal to 1, the value of num_negative_pics shall be in the range of 0 to MaxDpbSize−1. In some examples, The value of "sps_max_dec_pic_buffering_minus1[sps_max_sub_layers_minus1] plus 1" can specify the maximum number of decoded pictures of the base layer that need to be buffered.

Using these constraints, the value ranges of the syntax elements num_long_term_pics, num_negative_pics, and num_positive_pics can be derived. As a result, the video encoder 20, the video decoder 30, and other bitstream conformance checking entities can check whether the values of these syntax elements are within the specified value ranges. Moreover, the video encoder 20 can signal appropriate RPS and reference picture lists to the video decoder 30. Subsequently, the conforming coded video can be received and decoded at the video decoder 30.

The video encoder 20 and the video decoder 30 can be configured to inter-code all or portions of the pictures 102-114, 118-130, and potentially the picture 116 and/or the picture 132, using a reference picture set. For instance, after coding the pictures 100, 116, and 132, the video encoder 20 and the video decoder 30 may code the picture 108. Thus, the pictures 100, 116, and/or 132 may be included in a reference picture set for picture 108. After coding the picture 108, the video encoder 20 and the video decoder 30 may proceed to code the picture 104. Thus, the pictures 100, 116, 132, and/or 108 may be included in the reference picture set for the picture 104.

Figure 5:
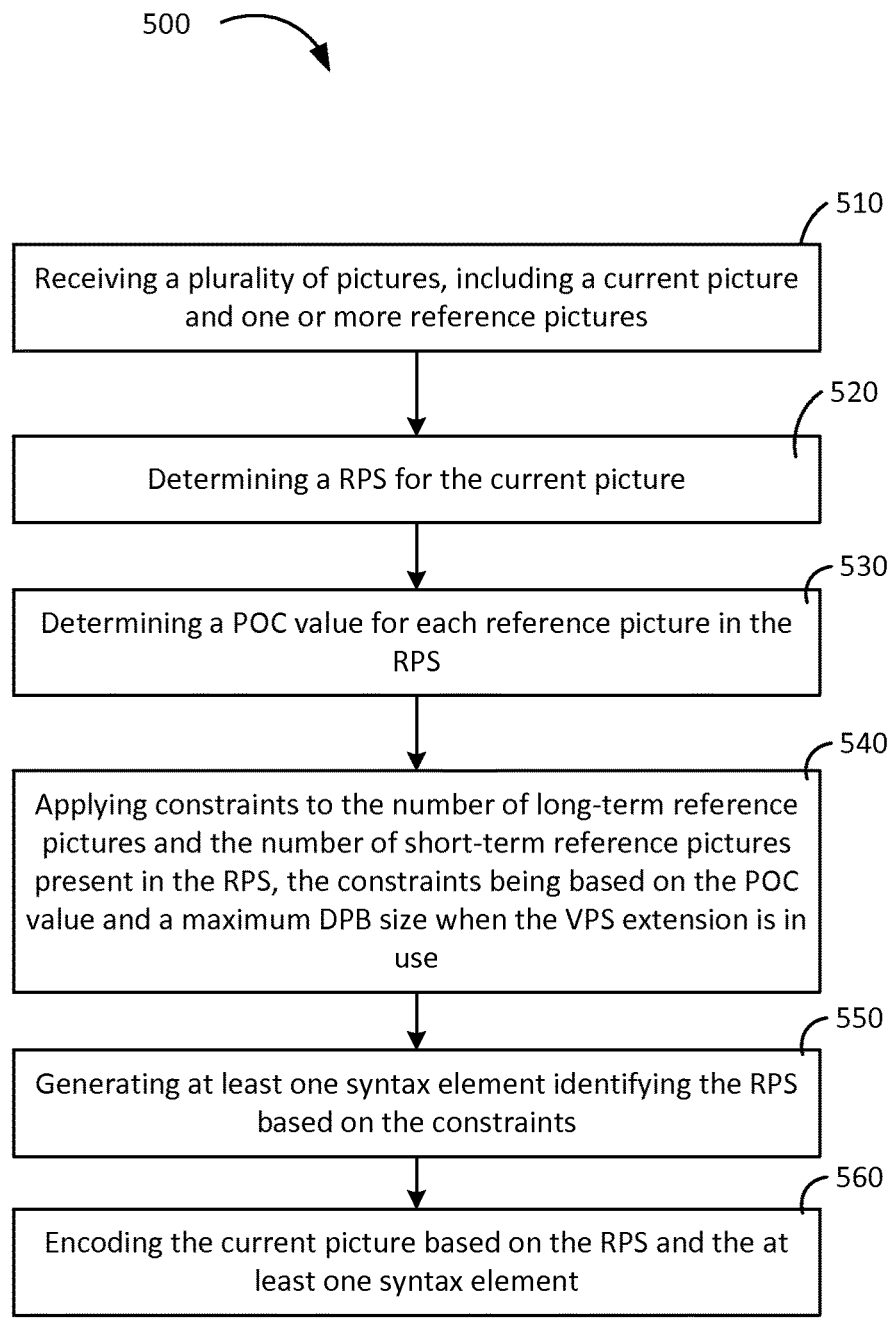
FIG. 5 is a flowchart of a method for encoding video data.

FIG. 5 is a flowchart of a method for encoding video data. The method 500 is indicative of a method for forming a reference picture set for a current picture based on certain constraints for reference picture set variables. At block 510, the video encoder 20 can receive a plurality of pictures. The plurality of pictures can be a series of pictures captured by, for example, the video source 18. The plurality of pictures can be one or GOPs (e.g., the GOP 134 and the GOP 136) with one picture being a current picture to be encoded.

At block 520, the video encoder 20, or more particularly the prediction module 41, can determine a current RPS for the current picture. The current RPS can have one or more reference pictures (from the plurality of pictures) for the current picture. In some examples, forming the current RPS may be performed multiple times, during multiple coding passes, e.g., from a variety of different potential reference pictures. The video encoder 20 can determine whether to include a particular reference picture in the ultimate reference picture set based on rate distortion optimization (RDO) techniques, a profile and/or level for a particular coding standard (e.g., HEVC), which may specify a maximum number of reference pictures to be stored in a decoded picture buffer at any given time, or other such characteristics.

The video encoder 20 can form a reference picture list from the current RPS. In some examples, the video encoder 20 can form two reference picture lists: RefPicList0, including reference pictures having an earlier display order than the current picture, and RefPicList0, including reference pictures having a later display order than the current picture.

At block 530, the video encoder 20 can determine a POC value for each of the pictures in the GOPs 134, 136, for example. Each of the pictures in the GOPs 134, 136 can have a POC that identifies the associated picture among all the other pictures in the GOP 134, 136 (or in, e.g., a CVS) and indicates the position of the associated picture in the output order relative to the output order of all of the other pictures in the same CVS that are to be output from the DPB 82. For example, if the current picture is the picture 116 (FIG. 4), then the pictures to the left (e.g., 100-114) may have a POC that is less than that of the picture 116, while the pictures to the right (e.g., 118-132) can have a POC higher than the picture 116. The POC of each picture can determine their status as a reference picture (e.g., long-term, short-term) and their ability to be stored in the RPS based on the constraints described herein.

At block 540, the video encoder can apply certain constraints to the number of pictures provided by the RPS and encoded. For example, the constraints can affect the number of long-term reference pictures identified in the RPS for the current picture. In some embodiments, when the nuh_layer_id is equal to 0 (e.g., the base layer), the sum of NumNegativePics[CurrRpsIdx], NumPositivePics[CurrRpsIdx], num_long_term_sps, and num_long_term_pics shall be less than or equal to sps_max_dec_pic_buffering_minus1[sps_max_sub_layers_minus1]. When vps_extension_flag is equal to 1, the sum of NumNegativePics[CurrRpsIdx], NumPositivePics[CurrRpsIdx], num_long_term_sps, and num_long_term_pics shall be less than or equal to MaxDpbSize−1. These values can be limited as such because all decoded pictures, including the current picture (being encoded or decoded) are stored in the DPB 82. Therefore the number of all reference pictures in the RPS cannot be larger than the size of the DPB 82, minus one.

In some embodiments, the short-term RPS can also be constrained. For example, when nuh_layer_id is equal to 0 (for the base layer), the value of num_negative_pics shall be in the range of 0 to sps_max_dec_pic_buffering_minus1[sps_max_sub_layers_minus1], inclusive. When vps_extension_flag is equal to 1, the value of num_negative_pics shall be in the range of 0 to MaxDpbSize−1, inclusive.

In some embodiments, the number of positive pictures (num_positive_pics) can also be constrained. For example, when nuh_layer_id is equal to 0 (for the base layer), the value of num_positive_pics shall be in the range of 0 to sps_max_dec_pic_buffering_minus1[sps_max_sub_layers_minus1]−num_negative_pics, inclusive. In another embodiment, when the vps_extension_flag is equal to 1, the value of num_positive_pics shall be in the range of 0 to maxNumPics MaxDpbSize−1−num_negative_pics, inclusive.

At block 550, the video encoder 20 can generate at least one syntax element identifying the RPS for the current picture based on the constraints. The constraints can further be affected by the number of pictures in the RPS and in the GOPs 134, 136, as well as the size of the DPB 82.

At block 560, the video encoder 20 can encode the current picture based on the RPS and the at least one syntax element.

Accordingly, the method 500 can be used to simplify the constraints of these variables when selecting reference pictures in the RPS.

Figure 6:
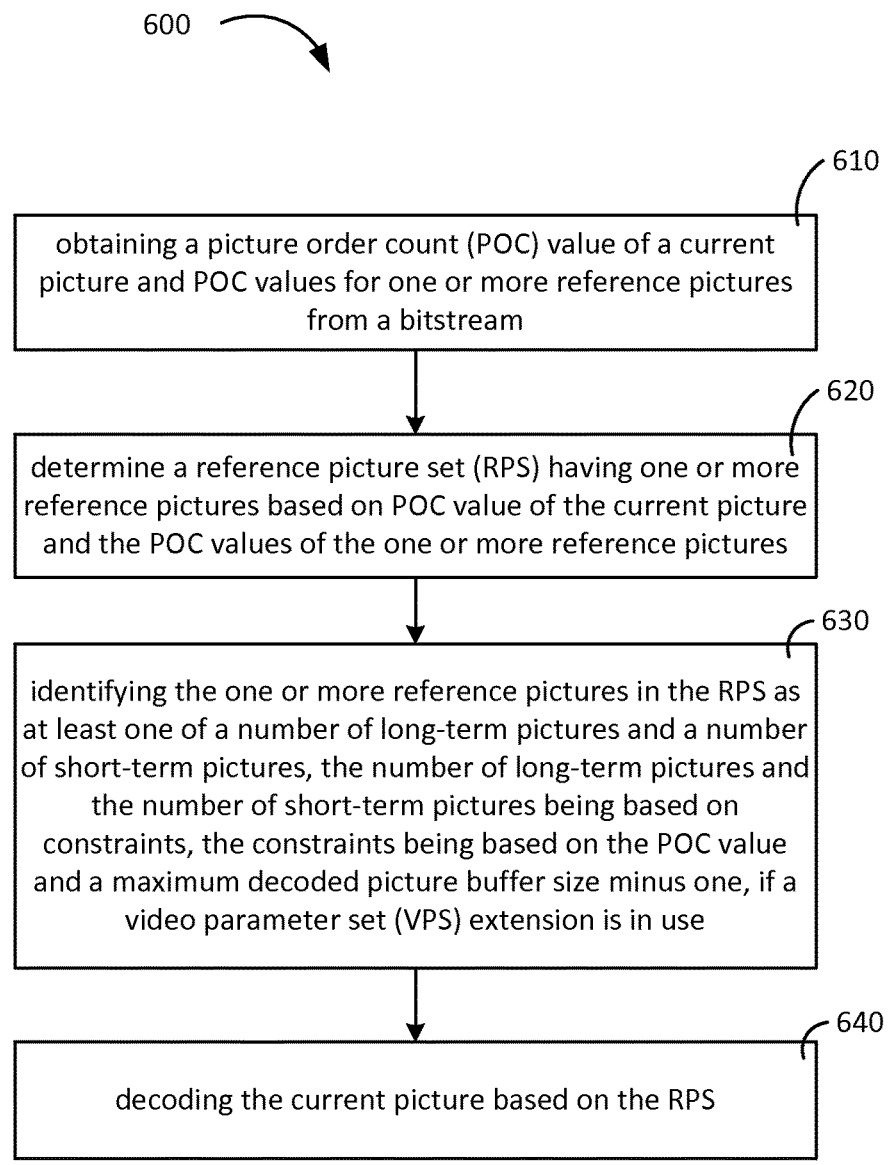
FIG. 6 is a flowchart of a method for decoding video data.

FIG. 6 is a flowchart of a method for decoding video data. A method 600 can be used in decoding video data, for example, the video data encoded in the method 500. At block 610 a video decoder can receive a bitstream and obtain a current picture and a RPS from the bitstream. The current picture can be stored as a coded picture in the CPB 90 at the video decoder 30 prior to being decoded. The RPS can contain one or more reference pictures that are used to decode the current picture.

At block 610, the video decoder 30 can obtain a POC value of the current picture, for example from the slice header. In some examples, this may only be required in the first slice segment of the current picture. Each coded picture in the bitstream can have a POC value. Decoded pictures can be used as reference pictures for the current picture. The video decoder 30 can thus obtain POC values for the one or more reference pictures. As described above, the POC can be used to identify pictures, for deriving motion parameters in merge mode and motion vector prediction, and for decoder conformance checking.

At block 620, the video decoder 30 can obtain a RPS for the current picture based on the POC values. The RPS can be obtained once per picture after decoding a slice header but prior to decoding any coding units and prior to decoding the reference picture list. The RPS can have multiple reference picture lists that are constructed based on the POC values of the current picture and the reference pictures (FIG. 4). A decoded picture can be stored in the DPB 82 and marked as "unused for reference," "used for short-term reference" or "used for long-term reference," but only one of the three at any given moment during the decoding process.

At block 630 the video decoder can identify the one or more reference pictures in the RPS (and the reference picture lists) as at least one of a number of long-term pictures and a number of short-term pictures, the number of long-term pictures and the number of short-term pictures being based on constraints. Such constraints can be based on the POC value and a maximum decoded picture buffer size minus one, if a VPS extension is in use. This can be indicated where the syntax element "vps_extension_flag" is equal to 1. The VPS extension may be in use when there is at least one non-base layer in the bitstream.

For example, in some embodiments, when the current picture is in the base layer (e.g., the nuh_layer_id is equal to 0), the sum of NumNegativePics[CurrRpsIdx], NumPositivePics[CurrRpsIdx], num_long_term_sps, and num_long_term_pics shall be less than or equal to sps_max_dec_pic_buffering_minus1[sps_max_sub_layers_minus1]. When vps_extension_flag is equal to 1, the sum of NumNegativePics[CurrRpsIdx], NumPositivePics[CurrRpsIdx], num_long_term_sps, and num_long_term_pics shall be less than or equal to MaxDpbSize−1. These values can be limited as such because all decoded pictures, including the current picture (being encoded or decoded) are stored in the DPB 82. Therefore the number of all reference pictures in the RPS cannot be larger than the size of the DPB 82, minus one.

In some embodiments, the short-term RPS can also be constrained. For example, when nuh_layer_id is equal to 0 (for the base layer), the value of num_negative_pics shall be in the range of 0 to sps_max_dec_pic_buffering_minus1[sps_max_sub_layers_minus1], inclusive. When vps_extension_flag is equal to 1, the value of num_negative_pics shall be in the range of 0 to MaxDpbSize−1, inclusive.

In some embodiments, the number of positive pictures (num_positive_pics) can also be constrained. For example, when nuh_layer_id is equal to 0 (for the base layer), the value of num_positive_pics shall be in the range of 0 to sps_max_dec_pic_buffering_minus1[sps_max_sub_layers_minus1]−num_negative_pics, inclusive. In another embodiment, when the vps_extension_flag is equal to 1, the value of num_positive_pics shall be in the range of 0 to maxNumPics MaxDpbSize−1−num_negative_pics, inclusive.

At block 640, the video decoder 30 can then decode the current picture based on the RPS. In this way, the video decoder 30 can then use the constrained values for the short-term pictures and the long-term pictures as described in connection with FIG. 5.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods described herein may be implemented in hardware, software, firmware, or any combination thereof. Such methods may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein. In addition, in some aspects, the functionality described herein may be provided within dedicated software modules or hardware modules configured for encoding and decoding, or incorporated in a combined video encoder-decoder (CODEC).

The coding methods discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

Although embodiments of the disclosure are described above for particular embodiment, many variations of the disclosure are possible. For example, the numbers of various components can be increased or decreased, modules and steps that determine a supply voltage can be modified to determine a frequency, another system parameter, or a combination of parameters. Additionally, features of the various embodiments can be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The above description of the disclosed embodiment is provided to enable any person skilled in the art to make or use the subject matter of the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method of encoding video data, comprising:
   receiving a plurality of pictures in a bitstream, the plurality of pictures including a current picture and one or more reference pictures;
   determining a reference picture set (RPS) for the current picture based at least in part on the one or more reference pictures;
   determining a picture order count (POC) value of each reference picture of the one or more reference pictures in the RPS;
   identifying at least one of a number of long-term reference pictures and a number of short-term reference pictures within the RPS;
   constraining a number of long-term pictures and the number of short-term pictures in the RPS, the constraints being based on the POC value and a maximum decoded picture buffer size minus one, if a video parameter set (VPS) extension is in use;
   if the plurality of pictures comprises a base layer of video data, constraining a sum of a number of negative pictures, a number of positive pictures, a number of longterm pictures derived based on candidate long term reference pictures specified in an active sequence parameter set (SPS), and a number of long-term pictures directly signaled in a slice header of the current picture to a value that is less than or equal to a maximum decoded picture buffer size identified in the active SPS minus one;
   generating at least one syntax element identifying the RPS based on the constraints;
   encoding the current picture based on the RPS and the at least one syntax element.

2. The method of claim 1 further comprising:
   if the VPS extension is in use, constraining a sum of a number of negative pictures, a number of positive pictures, a number of long-term pictures derived based on candidate long term reference pictures specified in an active sequence parameter set (SPS), and a number of long-term reference pictures directly signaled in a slice header of the current picture to a value that is less than or equal to maximum decoded picture buffer size minus one.

3. The method of claim 2 wherein the VPS extension is in use if there is at least one non-base layer in the bitstream.

4. The method of claim 1 further comprising:
if the VPS extension is in use, constraining a number of negative pictures to a value between zero and the maximum decoded picture buffer size minus one, inclusive, each negative picture of the number of negative pictures having a POC value that is less than a POC value of the current picture.

5. The method of claim 1 further comprising:
if the VPS extension is in use, constraining a number of positive pictures to a value between zero and the maximum decoded picture buffer size minus one, minus a number of negative pictures, inclusive, the number of positive pictures having a POC value greater than the POC value of the current picture and the number of negative pictures having a POC value that is less than a POC value of the current picture.

6. A device for encoding video data, comprising:
a memory configured to store a plurality of pictures obtained from a bitstream, the plurality of pictures including a current picture and one or more reference pictures; and
at least one processor operably coupled to the memory and configured to determine a reference picture set (RPS) for the current picture based at least in part on the one or more reference pictures;
determine a picture order count (POC) value of each reference picture of the one or more reference pictures in the RPS;
identify at least one of a number of long-term reference pictures and a number of short-term reference pictures within the RPS;
apply constraints to the number of long-term pictures and the number of short-term pictures in the RPS, the constraints being based on the POC value and a maximum decoded picture buffer size minus one, if a video sequence parameter (VPS) extension is in use;
if the plurality of pictures comprises a base layer of video data, constrain a sum of a number of negative pictures, a number of positive pictures, number of long-term pictures derived based on candidate long term reference pictures specified in an active sequence parameter set (SPS), and a number of long-term pictures directly signaled in a slice header of the current picture to a value that is less than or equal to a maximum decoded picture buffer size identified in the active SPS minus one;
generate at least one syntax element identifying the RPS based on the constraints;
encode the current picture based on the RPS and the at least one syntax element.

7. The device of claim 6 wherein the processor is further configured to:
if the VPS extension is in use, constrain a sum of a number of negative pictures, a number of positive pictures, a number of long-term pictures derived based on candidate long term reference pictures specified in an active sequence parameter set (SPS), and a number of long-term reference pictures directly signaled in a slice header of the current picture to a value that is less than or equal to the maximum decoded picture buffer size minus one.

8. The device of claim 7 wherein the VPS extension is in use if there is at least one non-base layer in the bitstream.

9. The device of claim 6 further comprising:
if the VPS extension is in use, constrain a number of negative pictures to a value between zero and the maximum decoded picture buffer size minus one, inclusive, each negative picture of the number of negative pictures having a POC value that is less than a POC value of the current picture.

10. The device of claim 6 further comprising:
if the VPS extension is in use, constrain a number of positive pictures to a value between zero and the maximum decoded picture buffer size minus one, minus a number of negative pictures, inclusive, the number of positive pictures having a POC value greater than the POC value of the current picture and the number of negative pictures having a POC value that is less than a POC value of the current picture.

11. A method for decoding video data, comprising:
obtaining a picture order count (POC) of a current picture and POC values for one or more reference pictures from a bitstream;
determining a reference picture set (RPS) having the one or more reference pictures based on the POC values of the current picture and the POC values of the one or more reference pictures;
identifying the one or more reference pictures in the RPS as at least one of a
number of long-term pictures and a number of short-term pictures, the number of long-term pictures and the number of short-term pictures being based on constraints, the constraints being based on the POC value and a maximum decoded picture buffer size minus one, if a video parameter set (VPS) extension is in use;
wherein if the current picture is in a base layer, a sum of a number of negative pictures, a number of positive pictures, a number of long-term pictures derived based on candidate long term reference pictures specified in an active sequence parameter set (SPS), and a number of long-term pictures directly signaled in a slice header of the current picture is constrained to a value that is less than or equal to a maximum decoded picture buffer size identifies in the active SPS minus one; and
decoding the current picture based on the RPS.

12. The method of claim 11, wherein if the VPS extension is in use, a sum of a number of negative pictures, a number of positive pictures, a number of long-term pictures derived based on candidate long term reference pictures specified in an active sequence parameter set (SPS), and a number of long-term reference pictures directly signaled in a slice header of the current picture is constrained to a value that is less than or equal to maximum decoded picture buffer size minus one.

13. The method of claim 11, wherein the VPS extension is in use if there is at least one non-base layer in the bitstream.

14. The method of claim 11, wherein if the VPS extension is in use, a number of negative pictures is constrained to a value between zero and the maximum decoded picture buffer size minus one, inclusive, each negative picture of the number of negative pictures having a POC value that is less than a POC value of the current picture.

15. The method of claim 11, wherein, if the VPS extension is in use, a number of positive pictures is constrained to a value between zero and the maximum decoded picture buffer size minus one, minus a number of negative pictures, inclusive, the number of positive pictures having a POC value greater than the POC value of the current picture and the number of negative pictures having a POC value that is less than a POC value of the current picture.

16. A device for decoding video data, comprising:
  a memory configured store a current picture, a picture order count (POC) of a current picture, and POC values for one or more reference pictures, the POC values and the current picture being obtained from a bitstream; and
  a processor operably coupled to the memory and configured to determine a reference picture set (RPS) having the one or more reference pictures based on the POC values of the current picture and the POC values of the one or more reference pictures, identify the one or more reference pictures in the RPS as at least one of a number of long-term pictures and a number of short-term pictures, the number of long-term pictures and the number of short-term pictures being based on constraints, the constraints being based on the POC value and a maximum decoded picture buffer size minus one, if a video parameter set (VPS) extension is in use, and
    wherein if the current picture is in a base layer, a sum of a number of negative pictures, a number of positive pictures, a number of long-term pictures derived based on candidate long term reference pictures specified in an active sequence parameter set (SPS), and a number of long-term pictures directly signaled in a slice header of the current picture is constrained to a value that is less than or equal to a maximum decoded picture buffer size identified in the active SPS minus one, and
    decode the current picture based on the RPS.

17. The device of claim 16, wherein if the VPS extension is in use, a sum of a number of negative pictures, a number of positive pictures, a number of long-term pictures derived based on candidate long term reference pictures specified in an active sequence parameter set (SPS), and a number of long-term reference pictures directly signaled in a slice header of the current picture is constrained to a value that is less than or equal to maximum decoded picture buffer size minus one.

18. The method of claim 16, wherein the VPS extension is in use if there is at least one non-base layer in the bitstream.

19. The method of claim 16, wherein if the VPS extension is in use, a number of negative pictures is constrained to a value between zero and the maximum decoded picture buffer size minus one, inclusive, each negative picture of the number of negative pictures having a POC value that is less than a POC value of the current picture.

20. The method of claim 16, wherein, if the VPS extension is in use, a number of positive pictures is constrained to a value between zero and the maximum decoded picture buffer size minus one, minus a number of negative pictures, inclusive, the number of positive pictures having a POC value greater than the POC value of the current picture and the number of negative pictures having a POC value that is less than a POC value of the current picture.

* * * * *